United States Patent
Bidner et al.

(10) Patent No.: US 8,950,366 B2
(45) Date of Patent: Feb. 10, 2015

(54) METHOD FOR REDUCING VALVE RECESSION IN GASEOUS FUEL ENGINES

(71) Applicant: Ford Global Technologies, LLC, Dearborn, MI (US)

(72) Inventors: David Karl Bidner, Livonia, MI (US); Mark Allen Dearth, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/889,094

(22) Filed: May 7, 2013

(65) Prior Publication Data

US 2014/0331951 A1 Nov. 13, 2014

(51) Int. Cl.

| F02B 43/00 | (2006.01) |
|---|---|
| F02B 47/00 | (2006.01) |
| F02M 25/00 | (2006.01) |
| F02B 3/06 | (2006.01) |
| F02B 1/04 | (2006.01) |
| F02B 43/10 | (2006.01) |
| F02D 19/08 | (2006.01) |

(52) U.S. Cl.
CPC *F02M 25/00* (2013.01); *F02B 3/06* (2013.01); *F02B 1/04* (2013.01); *F02B 43/10* (2013.01); *F02D 19/08* (2013.01)
USPC .......................................................... 123/1 A

(58) Field of Classification Search
CPC .............. F02B 1/04; F02B 43/10; F02B 3/06; F02M 25/00; F02D 19/08
USPC .......................................................... 123/1 A
See application file for complete search history.

(56) References Cited

U.S. PATENT DOCUMENTS

| 3,498,767 | A | | 3/1970 | Foster |
| 4,453,502 | A | * | 6/1984 | Resler, Jr. .................... 123/430 |
| 5,266,082 | A | * | 11/1993 | Sanders ........................ 44/357 |
| 5,409,310 | A | * | 4/1995 | Owczarz ...................... 366/136 |
| 5,433,756 | A | * | 7/1995 | Gonzalez ....................... 44/340 |
| 5,546,908 | A | | 8/1996 | Stokes |
| 5,718,194 | A | | 2/1998 | Binion |
| 7,398,763 | B2 | | 7/2008 | Gibson et al. |

(Continued)

FOREIGN PATENT DOCUMENTS

| EP | 0073306 B1 | 4/1986 |
| EP | 1120561 A2 | 8/2001 |

(Continued)

OTHER PUBLICATIONS

Pursifull, Ross Dykstra, "Gaseous Fuel System and Method for an Engine," U.S. Appl. No. 13/682,514, filed Nov. 20, 2012, 35 pages.

(Continued)

*Primary Examiner* — Lindsay Low
*Assistant Examiner* — Charles Brauch
(74) *Attorney, Agent, or Firm* — Julia Voutyras; Alleman Hall McCoy Russell & Tuttle LLP

(57) ABSTRACT

A method for operating a condensed natural gas engine, comprising injecting a mass of additive into the engine, the mass of additive a function of a mass-of-soot desired and producing a mass-of-soot during combustion, mass-of-soot produced a function of the mass of additive injected into the engine. By this method additional soot may be produced for heightened lubrication and valve protection.

17 Claims, 6 Drawing Sheets

(56) References Cited

U.S. PATENT DOCUMENTS

Figure 1:
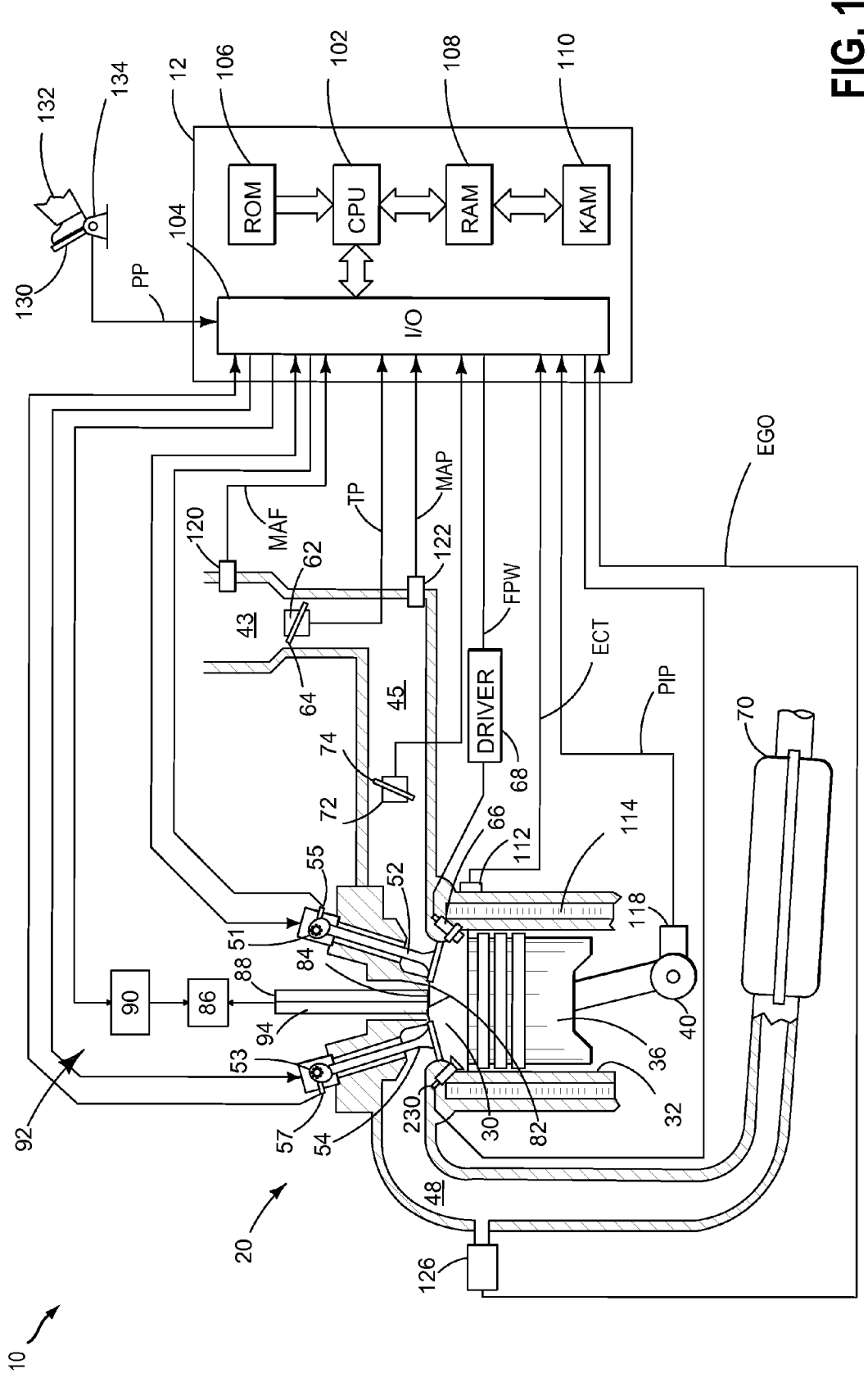

| | | |
|---|---|---|
| 7,444,987 B2 | 11/2008 | Cohn et al. |
| 8,166,953 B2 | 5/2012 | Caley |
| 8,327,687 B2 | 12/2012 | Amann et al. |
| 2006/0068973 A1* | 3/2006 | Kappauf et al. ............ 477/107 |
| 2007/0101968 A1 | 5/2007 | Gibson et al. |
| 2010/0018478 A1* | 1/2010 | Tamma et al. ................ 123/3 |
| 2010/0049421 A1* | 2/2010 | Futonagane et al. .......... 701/103 |
| 2010/0121559 A1 | 5/2010 | Bromberg et al. |
| 2010/0206260 A1 | 8/2010 | Tobias et al. |
| 2011/0021396 A1* | 1/2011 | Perry ........................... 508/463 |
| 2012/0143480 A1 | 6/2012 | Pursifull |
| 2013/0199499 A1 | 8/2013 | Pursifull |

FOREIGN PATENT DOCUMENTS

| | | |
|---|---|---|
| EP | 1213457 A2 | 6/2002 |
| EP | 1230327 B1 | 6/2006 |
| EP | 1213457 B1 | 11/2006 |
| EP | 1985833 A2 | 10/2008 |
| EP | 2048339 A1 | 4/2009 |
| JP | H05263698 A | 10/1993 |
| JP | 2002054522 A | 2/2002 |
| JP | 2004156552 A | 6/2004 |
| JP | 2005337100 A | 12/2005 |
| WO | 0236946 A1 | 5/2002 |
| WO | 2007092142 A2 | 8/2007 |
| WO | 2010089568 A1 | 8/2010 |

OTHER PUBLICATIONS

Bidner, David Karl et al., "Method and System for Engine Control," U.S. Appl. No. 13/743,237, filed Jan. 16, 2013, 32 pages.

Badillo, Ed et al., "Method and System for Engine Control," U.S. Appl. No. 13/754,667, filed Jan. 30, 2013, 39 pages.

Church, Jeremy Walter, "Feed Forward Dynamic Spool Valve," U.S. Appl. No. 13/762,018, filed Feb. 7, 2013, 33 pages.

Zhang, Xiaogang, "Strategy for Engine Cold Start Emission Reduction," U.S. Appl. No. 13/778,691, filed Feb. 27, 2013, 21 pages.

Rumpsa, Todd Anthony, "Method for Operating a Direct Fuel Injector," U.S. Appl. No. 13/852,824, filed Mar. 28, 2013, 26 pages.

Dearth, Mark Allen et al., "Direct Injection of Diluents or Secondary Fuels in Gaseous Fuel Engines," U.S. Appl. No. 13/889,047, filed May 7, 2013, 46 pages.

Bidner, David Karl et al., "Direct Injection of Diluents or Secondary Fuels in Gaseous Fuel Engines," U.S. Appl. No. 13/889,069, filed May 7, 2013, 65 pages.

Bidner, David Karl et al., "Method for Reducing Valve Recession in Gaseous Fuel Engines," U.S. Appl. No. 13/889,080, filed May 7, 2013, 36 pages.

Bidner, David Karl et al., "Direct Injection of Diluents or Secondary Fuels in Gaseous Fuel Engines," U.S. Appl. No. 13/889,103, filed May 7, 2013, 65 pages.

Packman, Keith, "Lean-Burn Engine Technology Increases Efficiency, Reduces NOx Emissions," Technical Information from Cummins Power Generation, Power Topic #7009, 2007, 2 pages.

\* cited by examiner

METHOD FOR REDUCING VALVE RECESSION IN GASEOUS FUEL ENGINES

BACKGROUND AND SUMMARY

Combustion engines, such as those within a vehicle propulsion system, are continuously exposed to high temperatures throughout operation. Much of the heat produced during combustion is absorbed by exhaust gas and transported throughout the exhaust system. The exhaust valves of an engine's cylinders are exposed to the highest temperatures during high load operation. These temperatures can affect the structural integrity of metal valves and valve seats within the engine. Over time, the decreased structural integrity and repetitive impact from valve opening and closing may cause the softening and warping of a valve or valve seat. Continued wear can cause the valve seat to recede into the engine and away from the valve. Valve seat recession can lead to engine overheating, decreased fuel efficiency, increased emissions, and valve degradation.

Valve seat recession is increased in natural gas engines for a number of reasons. Natural gas has a higher specific heat than gasoline and thus burns at a higher temperature. Natural gas also has a significantly smaller hydrogen-to-carbon ratio than gasoline engines. Thus, NG engines produce less carbon soot to provide thermal insulation and lubrication. At peak operation, rich running gasoline engines may operate up to 40% rich to abate valve overheating. In comparison, NG engines operate around 10% at peak conditions. Lean-running NG engines also cannot utilize advanced spark timing to lower engine temperatures during high load conditions. For these reasons, traditional gasoline engine methods to prevent valve recession have a diminished effect on NG engines. The inventors thus developed additional measures to increase thermal insulation and lubrication for NG engines, reducing valve recession.

The inventors found that additives may be injected into NG engines during operation to produce increased lubrication and thermal protection. They further found that by injecting an additive in response to an engine valve temperature, valve protection may be increased without unduly diminishing the increased efficiency and decreased emissions of NG engines.

Zinc phosphate coatings applied to ferrous and non-ferrous metals, such as aluminum or steel, are known to interact with some stearate compounds, such as sodium and potassium stearate, to form zinc stearate within the crystal lattice of the coating. This reaction creates a tightly bonded lubricant and protective coating on the surface of the metal. The inventors found that by coating a metal valve or valve seat in a zinc phosphate, and periodically exposing the valve to a stearate solution, a lubricating and protective coating is formed on the surface of the valve. This coating acts as both a physical and thermal barrier for the valve thus abating valve recession.

In another embodiment, the inventors found that by injecting an amount of hydrocarbon additive into the engine prior to combustion, soot production may be increased. However, an advantage of NG engines is clean emissions resulting in part, by the reduced particulate matter (soot) produced. Thus, by injecting a mass of additive in response to engine or valve temperature protective soot could be created during advantageous operating conditions and terminated when increased valve protection isn't desired.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION

Figure 2:
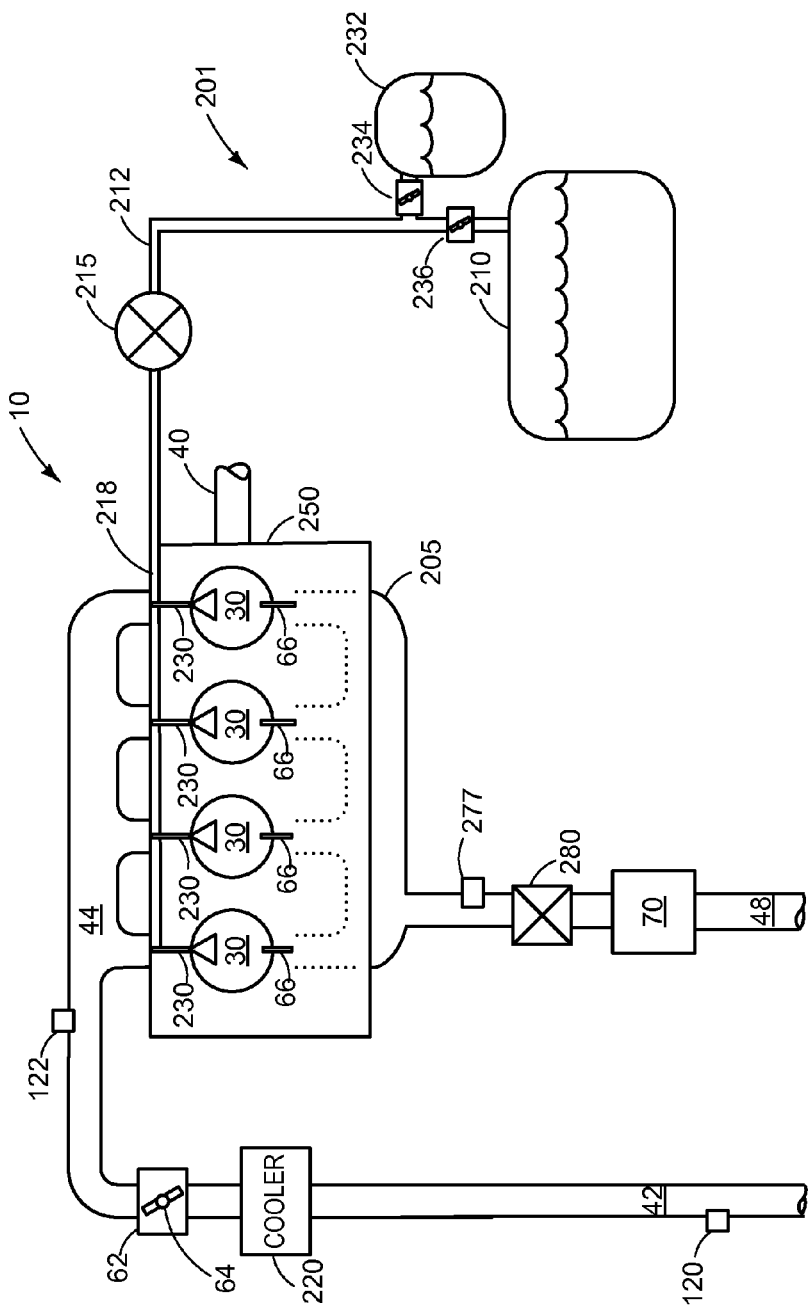

FIG. 1 shows an example embodiment of an engine system.
FIG. 2 schematically depicts an example embodiment of an engine and additive delivery system,
FIG. 3-FIG. 6 show example operating routines for an engine and additive delivery system.

DETAILED DESCRIPTION

Valve wear and valve seat recession is the degradation of engine valves over time and operation. The high temperatures and repetitive opening and closing of valves can degrade the interface between a valve and valve seat, leading to improper valve seating. Valve wear is most pronounced in exhaust valves that experience the highest heat absorption from exhaust gas.

In natural gas engines, valve wear is increased due to the higher specific heat of natural gas in comparison to liquid hydrocarbon fuel. Note that for the purposes of this disclosure natural gas may refer to condensed natural gas. Gasoline engines run rich (up to 40%) during peak operation in order to provide thermal cooling, protecting the valve seat and emission control catalysts. Further, during rich operation, the added fuel acts as a diluent that reduces the flame temperature lowering heat transfer and reducing knock tendency. Rich operation also allows for more spark advance further lowering exhaust temperature. NG engines, however, have a maximum operating richness around 10%. The incomplete combustions that result from rich engine operation further produce soot that acts as an exhaust valve lubricant and barrier or micro welding. The decreased hydrocarbon content and completeness of combustion in natural gas engines also contribute to the lack of protective soot production.

Other measures may therefore be taken to abate valve wear in NG engines. Engines retro-fitted for natural gas fueled operation are particularly susceptible to valve wear as they may not be designed to sustain the increased temperature. The pre-existing lubrication methods may also be insufficient for NG operation.

In engines already equipped with a combustion coolant, the coolant may act as a diluent. Alternately, an independent injection additive may be used and injected directly into the cylinder. Diluent doping mechanisms may also be provided in a natural gas retro-fit kit to make an engine robust with NG. In these systems, coolant, fuel, or other diluents such as wiper fluid may be delivered to or injected into the engine to reduce knock. Alternately, the doped diluent may be independently injected into an engine port via a single central injection system.

Injection of an additive into the engine may be in response to engine operating conditions such as temperature within the engine. In some embodiments an amount of diluent may be delivered in response to engine temperature or an indication of engine knock. An amount of additive may then be determined in response to valve temperature. Both the additive storage tank and diluent storage tank may be coupled to a single delivery apparatus upstream of the engine. The diluent and additive may be injected into the delivery apparatus and may mix prior to delivery to the engine, forming a solution.

In other embodiments, an additive may be injected into the diluent within a diluent storage tank to form a solution; the amount of additive injected into the diluent may be responsive to operating conditions such as valve temperature. The diluent additive solution may then be delivered to the engine. An amount of diluent additive solution delivered may be responsive to engine temperature or an indication of engine knock.

Other embodiments may have multiple injectors directly coupled to the cylinders. A first injector may inject diluent, a second injector may inject an additive (that may be dissolved in an aqueous solution), and a third injector may inject gasoline or natural gas. The amount of NG, gasoline, and/or stearate delivered to the engine may be in response to engine operating conditions including valve or engine temperature.

Some embodiments may have a single storage tank with an additive doped diluent solution. This solution may be prepared prior to storage tank fill. A solution may have a predetermined concentration of stearate to diluent to achieve desired valve cooling. Note that the diluent may be a liquid and may or may not be intended to provide unrelated operating benefits. Further, it may be delivered to the engine system in response to, and via, methods not otherwise disclosed herein.

Alternately, additive may be injected into a delivery apparatus or a diluent at certain intervals that may include time, operating time, and total mass of intake air flow. For example, a sensor may monitor a mass of intake air flow that has been delivered to the engine since the most recent additive replenish event. If the total mass of intake airflow reaches a predetermined value, an amount of stearate may be delivered to the engine via any of the methods disclosed herein.

An example embodiment may use an additive in combination with a reactive coating on the valve or valve seat. Zinc diethyldithiophosphate (ZDDP) is known to be an effective lubricant additive to prevent valve wear in NG and gasoline fueled engines. ZDDP, however, may cause degradation in the catalytic converters that reduce engine emissions. Phosphorous and sulfur derivatives poison the catalysts within catalytic converters when used in engine oil. Catalytic converters generally use one or more catalytic metals such as platinum or palladium within the exhaust system to oxidize toxic byproducts of combustion including hydrocarbons, nitrogen and carbon monoxide. Phosphorous and sulfur from ZDDP doped lubricants deactivates the catalysts, reducing their effectiveness.

However, when zinc phosphate is applied to a metal and allowed to interact with reactive stearates (which may be dissolved in an aqueous solution) a dry film lubricant forms and adheres to the surface of the metal. In a disclosed embodiment, an engine with a zinc phosphate coating has diluent that is doped with a reactive stearate diluent injected in to cylinders. Reactive stearates may include chemicals and compounds such as sodium stearate or potassium stearate or other ionizable compounds or elements that are not highly reactive with the catalytic chemicals within a catalytic converter. Thus in some embodiments the additive may include stearate or a stearate doped diluent.

In other embodiments, an additive may be used to increase a mass-of-soot production. These embodiments may use an additive with a higher hydrocarbon concentration than is present within NG. Some embodiments may use a liquid fuel source such as gasoline to increase soot production. In retrofitted engines an additive may be stored within the gasoline engine and injected via the fuel injector.

In other embodiments, the additive may include an aromatic hydrocarbon. Aromatic hydrocarbons (also called ring hydrocarbons) are hydrocarbons with alternating single and double bonds to form a ring such as a benzene ring $C_6H_6$. Aromatic hydrocarbons tend to have relatively stable bonds leading to soot production after combustion. Hydrocarbons with a high mass tend to have diffuse flame combustion. Thus high mass hydrocarbons may be used as an additive due to the higher soot production from diffuse flame combustion. Higher soot may result from the lack of homogeneity of oxygen within the cylinder during combustion. Preventing complete combustion in part of the cylinder and thus producing soot.

In some embodiments the additive may include naphthalene ($C_{10}H_8$). Naphthalene has the strong bonds of a hydrocarbon as well as a high octane number. The high octane number allows for heightened compression before auto-ignition. This is advantageous to present engine knock and pre-ignition. Further, unlike some hydrocarbons, naphthalene does not a major carcinogen.

In other embodiments the additive may include acetylene $C_2H_2$ which similarly has a high octane number. Further, acetylene has a wider AFR operating range than many NG and thus may be injected to achieve increased AFR richness than is achievable via natural gas alone. Richer engine operation may decrease engine temperature to prevent degradation and knock.

Thus, in some embodiments, a mass-of-soot produced may be a function of the quantity of aromatic hydrocarbon within the engine during combustion from the additive injection. The quantity of aromatic hydrocarbons within the additive may be determined during the preparation of the additive such that the additive has a set aromatic hydrocarbon content throughout operation. Thus, increasing a mass of additive in the engine during combustion increases the quantity of aromatic hydrocarbons in the engine during combustion and thus increases the mass-of-soot produced.

In an embodiment, the amount of additive injected may be a function of the engine or engine valve temperature such that protective soot can be produced in response conditions that may otherwise lead to valve degradation. Similarly, when valve degradation conditions are not indicated via increased engine or valve temperature, the mass of additive injected may be lowered so as to return the engine to low emission operation.

FIG. 1 is a schematic diagram showing one cylinder of multi-cylinder engine 10, which may be included in a propulsion system of an automobile. The engine may be fuel via natural gas, gasoline, or both. A control system may control engine operation via controller 12 that may be responsive to various sensors within the engine system and input from vehicle operator 132 via an input device 130. Input device 130 may include an accelerator pedal and a pedal position sensor 134 for generating a proportional pedal position signal PP. Cylinder 30 of engine 10 may exist between cylinder walls 32 and piston 36 may be positioned therein. Piston 36 may be coupled to crankshaft 40 so that reciprocating motion of the piston is translated into rotational motion of the crankshaft. Crankshaft 40 may be coupled to at least one drive wheel of a vehicle via an intermediate transmission system.

Cylinder 30 may receive intake air from intake manifold 44 via intake passage 42 and may exhaust combustion gases via exhaust passage 48.

Intake manifold 44 and exhaust passage 48 may selectively communicate with cylinder 30 via respective intake valve 52 and exhaust valve 54. In some embodiments, cylinder 30 may include two or more intake valves and/or two or more exhaust valves.

In this example, intake valve 52 and exhaust valves 54 may be controlled by cam actuation via respective cam actuation systems 51 and 53. Cam actuation systems 51 and 53 may each include one or more cams and may utilize one or more of cam profile switching (CPS), variable cam timing (VCT), variable valve timing (VVT) and/or variable valve lift (VVL) systems that may be operated by controller 12 to vary valve operation. The position of intake valve 52 and exhaust valve 54 may be determined by position sensors 55 and 57, respectively. In alternative embodiments, intake valve 52 and/or exhaust valve 54 may be controlled by electric valve actuation. For example, a cylinder may include an intake valve controlled via electric valve actuation and an exhaust valve controlled via cam actuation.

Exhaust valve 54 may be exposed to the hot exhaust gas from combustion passing from cylinder 30 to exhaust passage 48. Heat from combustion may be transmitted throughout the exhaust system via exhaust gas. Exhaust valve 54 may be exposed to the highest heat of exhaust and experience heightened valve wear.

Exhaust valve 54 and intake valve 52 may have a phosphate coating. The coating may include a solution with phosphoric acid and phosphate salts diluted therein. In an embodiment, the coating may be a zinc, iron, or manganese phosphate. The valve and/or valve seat may be made of a ferrous or non-ferrous metal such as steel. In other embodiments the valve may be coated in a reactive metal prior to being coated in the phosphate coating such that its outer surface is plated with the reactive metal. Such preliminary coatings may include aluminum, zinc, cadmium, silver, tin, or some combination thereof.

A phosphate coating may be applied during vehicle production by immersing a valve or valve seat in a phosphate solution or spraying the phosphate coating onto the engine surface directly. In other embodiments, the phosphate coating may be applied after production and may be included in a retro-fit kit to make a gasoline engine robust with natural gas. Phosphate coatings may be periodically reapplied to the engine. Alternately, engine components may be removed for phosphate coating reapplication. In some embodiments, a control system may monitor an amount of valve wear. At a valve recession threshold, an indication may be given to reapply a phosphate coating. A reapplication indicator may also be responsive to a mileage or operation duration threshold.

Fuel injector 66 is shown coupled directly to cylinder 30 for injecting fuel directly therein. An amount of fuel injection may be proportional to pulse width of signal FPW received from controller 12 via electronic driver 68. In this manner, fuel injector 66 provides what is known as direct injection of fuel into cylinder 30. The fuel injector may be mounted in the side of the cylinder or in the top of the cylinder, for example. Fuel may be delivered to fuel injector 66 by a fuel system (not shown) including a fuel tank, a fuel pump, and a fuel rail. In some embodiments, cylinder 30 may alternatively or additionally include a fuel injector arranged in intake manifold 44 in a port injection configuration.

Injected fuel may be natural gas or liquid gasoline such as petroleum or diesel. Some embodiments may include both a natural gas fuel injector and a liquid gasoline fuel injector. In primarily natural gas engines, gasoline may be injected in the absence of available NG. Other embodiments may inject gasoline in response to operating conditions such as high engine temperature, pre-ignition, or engine knock indication.

Additive injector 230 is shown coupled directly to cylinder 30 for injecting additive directly therein. Additive may be doped into a diluent prior to injection into cylinder 30. A diluent may be an amount of fuel, coolant, or another liquid that may be injected with an mass of additive prior to injection in to the cylinder. An amount of diluent injected into the cylinder may be determined by a controller 12 in response to operating conditions such as high engine temperature, pre-ignition, or engine knock indication. Additive may be injected into a diluent in response to operating conditions such as operation temperature or engine valve temperature. Alternately, additive may be injected periodically at given operating time or mileage intervals, for example. Other embodiments may inject additive directly into the fuel source. For example, additive may be injected into fuel upstream of fuel injector 66 and delivered to cylinder 30 via fuel injector 66. Still further embodiments may combine additive and diluent or fuel prior to injection of additive into the cylinder. Embodiments may also inject additive directly into the cylinder via an additive delivery apparatus without the addition of diluent.

A predetermined additive to diluent ratio may be maintained within the storage system of the diluent or fuel. In these embodiments, the amount of diluent or additive injected into the cylinder may or may not be responsive to engine conditions or periodic injection. Example diluents may include gasoline, engine coolant, engine oil, water, or wiper fluid.

In the example shown, the additive injector 230 and fuel injector 66 may be located on the side of the cylinder 30. In some embodiments, one or both fuel injector 66 and additive injector 230 may be located at the top or bottom of the cylinder. In other embodiments, an injector may be located within the intake system upstream of cylinder 30.

Intake passage 42 may include a throttle 62 having a throttle plate 64. The position of throttle plate 64 may be varied by controller 12 via a signal provided to an electric motor or actuator in an electronic throttle control (ETC) configuration. In this manner, throttle 62 may be operated to vary the intake air provided to cylinder 30 among other engine cylinders. The position of throttle plate 64 may be provided to controller 12 by throttle position signal TP. Intake passage 42 may include a mass air flow sensor 120 and a manifold air pressure sensor 122 for providing respective signals MAF and MAP to controller 12.

Ignition system 88 may provide an ignition spark to cylinder 30 via spark plug 82 in response to spark advance signal SA from controller 12. In some embodiments, one or more other cylinders of engine 10 may be operated in a compression ignition mode, with or without an ignition spark.

Exhaust gas sensor 126 is shown coupled to exhaust passage 48 upstream of emission control device 70. Sensor 126 may be a suitable sensor for providing an indication of exhaust gas air/fuel ratio such as a linear oxygen sensor or UEGO (universal or wide-range exhaust gas oxygen), a two-state oxygen sensor or EGO, a HEGO (heated EGO), a NOx, HC, or CO sensor. Emission control device 70 is shown arranged along exhaust passage 48 downstream of exhaust gas sensor 126. Device 70 may be a three way catalyst (TWC), NOx trap, various other emission control devices, or combinations thereof. In some embodiments, emission control device 70 may be periodically regenerated during operation of engine 10 by operating at least one cylinder of the engine within a particular air/fuel ratio resulting in heightened heat generation.

Engine 10 may further include a compression device such as a turbocharger or supercharger wherein a compressor is arranged along intake manifold. For a turbocharger, a compressor may be at least partially driven by a turbine (e.g. via a shaft) arranged along an exhaust passage. One or more of a wastegate and a compressor bypass valve may also be included to control flow through the turbine and compressor. For a supercharger, a compressor may be at least partially driven by the engine and/or an electric machine, and may not include a turbine. Thus, the amount of compression provided to one or more cylinders of the engine via a turbocharger or supercharger may be varied by controller 12.

Controller 12 is shown in FIG. 1 as a microcomputer, comprising microprocessor unit 102, input/output ports 104, an electronic storage medium for executable programs and calibration values shown as read-only memory 106, random access memory 108, keep alive memory 110, and a data bus. Controller 12 may receive various signals from sensors coupled to engine 10, in addition to those signals previously discussed, including measurement of inducted mass air flow (MAF) from mass air flow sensor 120; engine coolant temperature (ECT) from temperature sensor 112 coupled to cooling sleeve 114; a profile ignition pickup signal (PIP) from Hall effect sensor 118 (or other type) coupled to crankshaft 40; throttle position (TP) from a throttle position sensor; and absolute manifold pressure signal, MAP, from sensor 122. Engine speed signal, RPM, may be generated by controller 12 from signal PIP. Manifold pressure signal MAP from a manifold pressure sensor may be used to provide an indication of vacuum, or pressure, in the intake manifold. Note that various combinations of the above sensors may be used.

Storage medium read-only memory 106 may be programmed with computer readable data with instructions executable by CPU 102 for performing disclosed and other methods.

As described above, FIG. 1 shows one cylinder of a multicylinder engine, and each cylinder may similarly include its own set of intake/exhaust valves, fuel injector, additive injector, spark plug, etc.

FIG. 2 is a schematic diagram of an engine 10 in accordance with the present disclosure. As depicted, cylinder head 250 includes four cylinders 30 in a straight line configuration. The cylinders may be arranged in an inline configuration as shown or in another configuration such as an opposed or V configuration and may include a number of cylinders. Each cylinder 30 is shown with a fuel injector 66. Fuel injector 66 may be configured as a direct fuel injector or a port fuel injector. In one example, the engine may be configured to run on multiple fuel sources, such as gasoline as well as natural gas.

As shown in FIG. 1, the cylinders 30 may receive intake air from intake manifold 44 via intake passage 42. Intake passage 42 may further include throttle 62, throttle plate 64, MAF sensor 120 and MAP sensor 122 positioned therein. A charge air cooler 220 may be disposed within intake passage 42.

Exhaust from cylinder 30 may exit cylinder head 250 via exhaust passage 48. Exhaust passage 48 may be connected to cylinders 30 via exhaust manifold 205. As shown in FIG. 2, exhaust manifold 205 may be wholly or partially included within cylinder head 250 in an integrated exhaust manifold configuration. Exhaust manifold 205 may include a plurality of exhaust runners coupled to cylinder exhaust ports via exhaust valves. Exhaust passage 48 may further include temperature sensor 277, backflow valve 280 and emission control device 70.

As shown in FIG. 2, engine 10 may include an additive delivery apparatus 201. Additive delivery apparatus 201 may include additive delivery passage 218 coupled to cylinder head 250. Additive delivery passage 218 may be configured to inject an mass of additive into cylinders 30. Additive delivery passage 218 may be coupled to tank 210 via supply line 212. A pump 215 may be coupled to supply line 212. In this way, diluent may be drawn from diluent tank 210 through supply line 212, pumped into additive delivery passage 218, and injected into cylinders 30. Tank 210 may include fuel or other diluents that may be injected in to cylinder 30 to reduce knock. Delivery may be controlled by a controller actuating a diluent valve 236. Examples of other diluents include wiper fluid or other hydrocarbon fuel additives such as aqueous naphthalene or acetylene. An additive tank 232 may store an amount of stearate or other reactive additive that may be within an additional liquid solution. Tank 232 may be coupled to supply line 212 via additive valve 234. Additive valve 234 may be communicatively coupled to a controller responsive to operating conditions that may include exhaust valve temperature. In other embodiments diluent tank 210 may be coupled to a diluent injector and additive tank 232 may be coupled to an additive injector, either or both of which may be disposed on the cylinder 30. A controller may actuate diluent valve 236 so that diluent is delivered into the additive delivery apparatus without the addition of a reactive additive. Valves 234 and 236 may also be actuated so that reactive additive dissolves within a diluent in the additive delivery apparatus upstream of pump 215.

In some embodiments, there may be no diluent and a reactive additive may be injected directly from additive tank 232 into cylinder 30. In an embodiment including a single central injection system, fuel, diluent, and additive may be coupled upstream of a fuel injector and independently delivered to a single central injection passage. An amount of fuel, diluent, and additive may be delivered to the engine and injected via a single injector.

In still further embodiments, additive tank 232 may be coupled to diluent tank 210 directly so that additive is injected into diluent tank 210 upstream of the additive delivery apparatus 201 and/or diluent valve 236.

Engine 10 may also include a cooling system (not shown), that may include a cooling jacket coupled to a cylinder head. The cooling jacket may be configured to cool an integrated exhaust manifold, such as exhaust manifold 205 and may be coupled to tank via a supply and return line. A coolant pump may be coupled to the supply line. In this way, coolant may be drawn from a coolant tank through the supply line, pumped into the cooling jacket, and returned to the tank via the return line.

Figure 3:
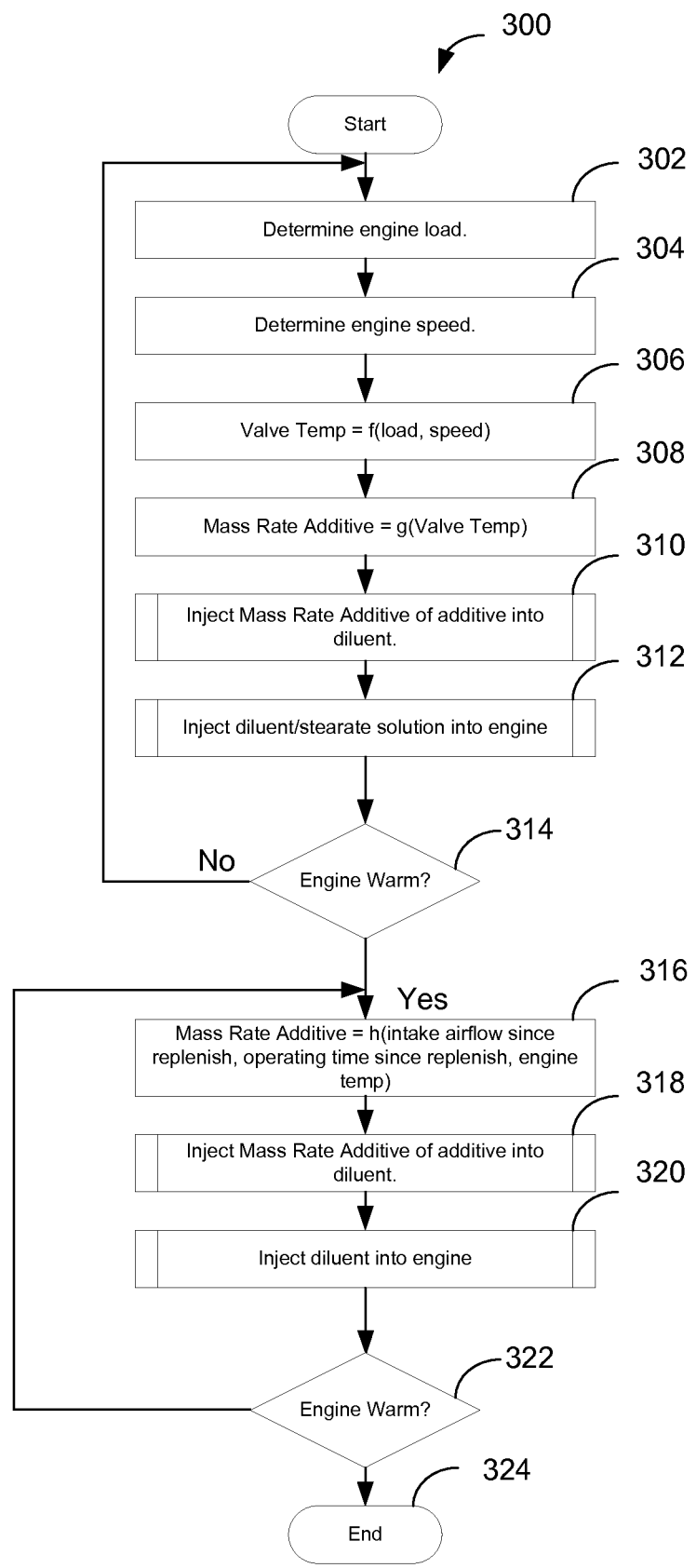

An example operating method of engine 10 is shown in FIG. 3. The method begins at 300 and may be initiated after an engine-on event. At 302 the engine load may be determined. This may be determined in response to a measured MAP and communicated to a controller. At 304, engine speed may be determined and relayed to the controller. The temperature of the exhaust valve, intake valve, or both may be determined at 306. Temperature may be determined using a number of methods including a sensor within the cylinder, intake or exhaust manifold. As shown, it may also be a function of the determined engine load and engine speed. This relationship may be predetermined for a specific engine and other presiding engine operating conditions that may be communicated to the controller via various sensors. At 308 an amount of reactive additive or stearate to be delivered to the engine may be determined. The mass rate of additive delivered may be a function of the valve temperature determined at 306. At 310 the required mass rate of additive may be injected into a diluent to form a solution. The diluent may be a liquid to be delivered to the cylinders. This may include the fuel source for engine operation such as natural gas, gasoline, or some combination thereof. In some embodiments of NG engines, liquid fuel or another liquid may be injected to lower the temperature of combustion or increase soot production. In these NG engines, the liquid may act as a diluent and may be doped with additive at 312. Alternately, additive may be within a solution prior to injection and an amount of doped solution to be injected may be determined as a function of the mass rate of additive to be delivered and the concentration of additive within the solution. The solution may be delivered directly to the cylinder or may be injected into an additional diluent prior to cylinder injection. Note that the mass rate of additive required may be zero.

At 312 the additive doped diluent may be injected into the cylinders of the engine. At 314 it may be determined if the engine is warm. If the engine is not warm the process may return to the cold engine operation loop that begins at 302 and ends at 312. If the engine is warm then a mass rate of additive required may be determined using a method that is different from the method at 308. At 316, the mass rate of additive required may be a function of the amount of intake airflow to the engine since the last additive replenishing event, the operating time since the last additive replenishing event, and/or the presiding engine temperature. At 318 the determined mass rate of additive required may be injected into a diluent. At 320 the diluent may be injected into the engine's cylinders. In other embodiments, the additive may already be within a diluent and an amount of additive doped diluent may be a function of the mass rate of additive required and the concentration of additive in the diluent. This may be injected directly into the engine or into another diluent. Note that the mass rate of additive required may be zero.

Figure 4:
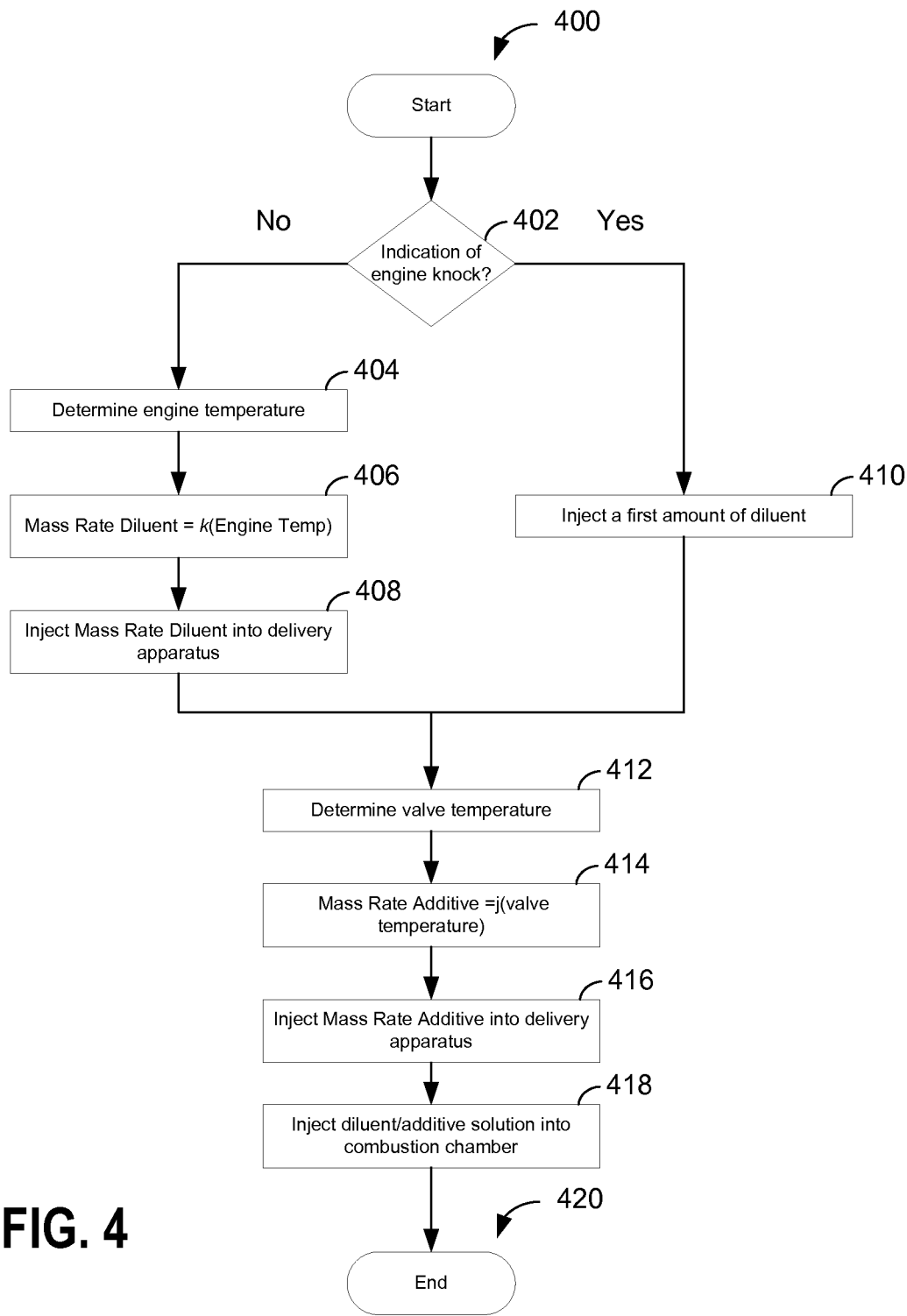

An alternate example operating method is shown in FIG. 4, this method may be compatible with an engine system with a additive storage tank, a diluent storage tank, and a delivery apparatus coupled to both tanks upstream of the cylinder. The method may begin at 400 and may be initiated periodically or in response to an engine on event. It may also repeat continuously throughout engine operation. At 402 it may be determined if engine knock has been indicated. Engine knock may be indicated by one or more sensors within the ignition system. A sensor may be responsive to vibration, pressure, or temperature that may be communicated to a controller to determine the existence of engine knock. If engine knock is indicated, an amount of diluent may be injected into the delivery apparatus to abate engine knock. This diluent may be liquid fuel or another liquid capable of lowering the temperature of combustion within the engine. If engine knock is not indicated, the engine temperature may be determined at 404. A mass rate of diluent to achieve or maintain engine temperature may be determined as a function of current engine temperature at 406. At 408 this amount of diluent may be injected into a delivery apparatus. Note that this amount of diluent may be zero, particularly during engine warm up.

At 412 the valve temperature may be determined by a sensor within the cylinder, intake manifold, or exhaust manifold and communicated to the control system. At 414 a mass rate of additive to achieve or maintain a valve temperature may be determined as a function of valve temperature at 414. In other embodiments, the mass rate of additive delivered may be in response to an amount of airflow into the engine since the last additive replenish event, an amount of operating time that has elapsed since the last additive replenish event, and/or engine temperature. At 416 the determined amount of additive may be injected into the delivery apparatus where it may mix with and/or dissolve in the diluent injected at 410 or 408. This additive doped diluent may then be injected into the cylinder at 418.

Figure 5:
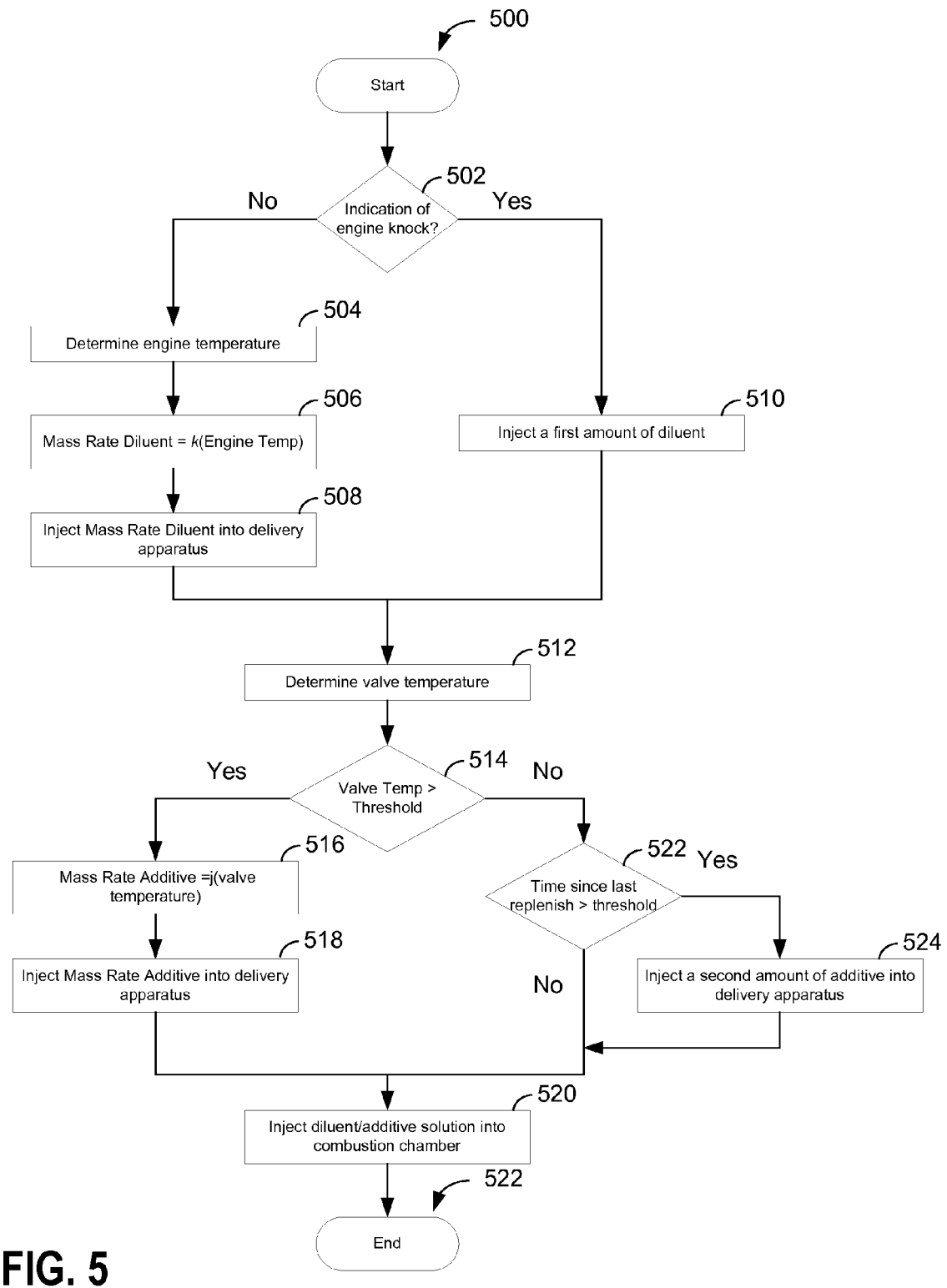

Turning now to FIG. 5, an additional operating method is shown that may be compatible with an engine system with a additive storage tank, a diluent storage tank, and a delivery apparatus coupled to both tanks upstream of the cylinder. The method may begin at 500, and may be initiated periodically or in response to an engine on event. It may also repeat continuously throughout engine operation. At 502 it may be determined if engine knock has been indicated. Engine knock may be indicated by one or more sensors within the ignition system. A sensor may be responsive to vibration, pressure, or temperature that may be communicated to a controller to determine the existence of engine knock. If engine knock is indicated an amount of diluent may be injected into the delivery apparatus to abate engine knock. This diluent may be liquid fuel or another liquid that is capable of lowering the temperature of combustion within the engine. If engine knock is not indicated, the engine temperature may be determined at 504. A mass rate of diluent to achieve or maintain engine temperature may be determined as a function of current engine temperature at 506. At 508 this amount of diluent may be injected into a delivery apparatus. Note that this amount of diluent may be zero, particularly during engine warm up.

At 512 the valve temperature may be determined by a sensor within the cylinder, intake manifold, or exhaust manifold and communicated to the control system. It may then be determined if the temperature is above a threshold temperature at 514. The threshold temperature may correspond to a temperature at which the valve metal softens or another temperature that causes heightened potential for valve wear. If the temperature is above this threshold, at 516 a mass rate of additive may be determined in response to the temperature measured at 512. At 518 this amount of additive may be injected into the delivery apparatus where it may mix and/or be dissolved in the diluent injected at 508 or 510. If the valve temperature is not above a threshold at 514 it may be determined if an amount of time has passed since the last additive replenish event. In other embodiments, it may be determined if an amount of operating time had elapsed or an amount of air flow delivered to the engine has exceeded a threshold since the last replenish event. If the threshold is reached at 522, an amount of additive may be injected into the delivery apparatus to mix or be dissolved in the diluent. This may be a predetermined amount or may be determined in response to valve temperature, airflow since last replenish event, or the elapsed operating time since the last replenish event. At 520 the additive doped diluent may be injected into the cylinder.

It should be noted that methods similar to those depicted above may be compatible with engines that do not have a separate diluent or have independent injection valves for the additive and the diluent that may both be independently coupled to the cylinder.

Upon injection of additive into the cylinder combustion may occur. The stearate or reactive additive may then come into contact with the phosphate surface of one or more valves. Stearate or a reactive additive may interact with the surface of the valve to form a dry protective film or a mass-of-soot on the valve, the valve seat, or both. This may thermally insulate the valve and the valve seat. It may also act as a lubricant that may lower the friction between the valve and valve seat, reducing valve wear. Further, it may act as a physical barrier during the repeated opening and closing of the valve such that the valve and valve seat come into limited direct contact with each other. A stearate that interacts with the phosphate may include sodium or potassium stearate or other ionizable compounds or elements. Many of these compounds have no or little effect with the catalysts that are commonly used in exhaust after treatment devices.

In embodiments using increased soot production as the lubricant, a mass of additive may be determined in response to the mass-of-soot desired. Increase soot production in natural gas combustion may result from the injection of the additive into the engine cylinders during combustion. Injection may be direct or indirect, for example, an additive may be injected into a diluent to form a solution that is then injected into the engine. In other embodiments the additive, diluent, or solution may be injected into the fuel source or the intake air stream.

Increasing or initiating a mass of additive injected into the NG engine may be in response to increasing a mass-of-soot desired and decreasing a mass of additive injected into the engine in response to decreasing a mass-of-soot desired. Further, increasing a mass-of-soot produced during combustion may be in response to increasing a mass of additive injected into the engine and decreasing a mass-of-soot produced may be in response to decreasing a mass of additive injected into the engine.

Increasing a mass-of-soot produced may decrease valve wear thus, in some embodiments, increasing a mass-of-soot produced may be responsive to engine valve temperature increasing or exceeding a threshold. Similarly, if engine valve temperature decreases or falls below a threshold the mass-of-soot produced may decrease. Engine valve temperature may be determined using one or more temperature sensors located within the engine or exhaust system. It may also be inferred in response to operating conditions such as engine speed or load. A mass-of-soot desired may be responsive to the mass-of-soot being produced under the presiding operating conditions. This may be measured or inferred using one or more sensors that may measure particulate matter, carbon dioxide, oxygen, humidity, or NOx levels within the exhaust system.

Figure 6:
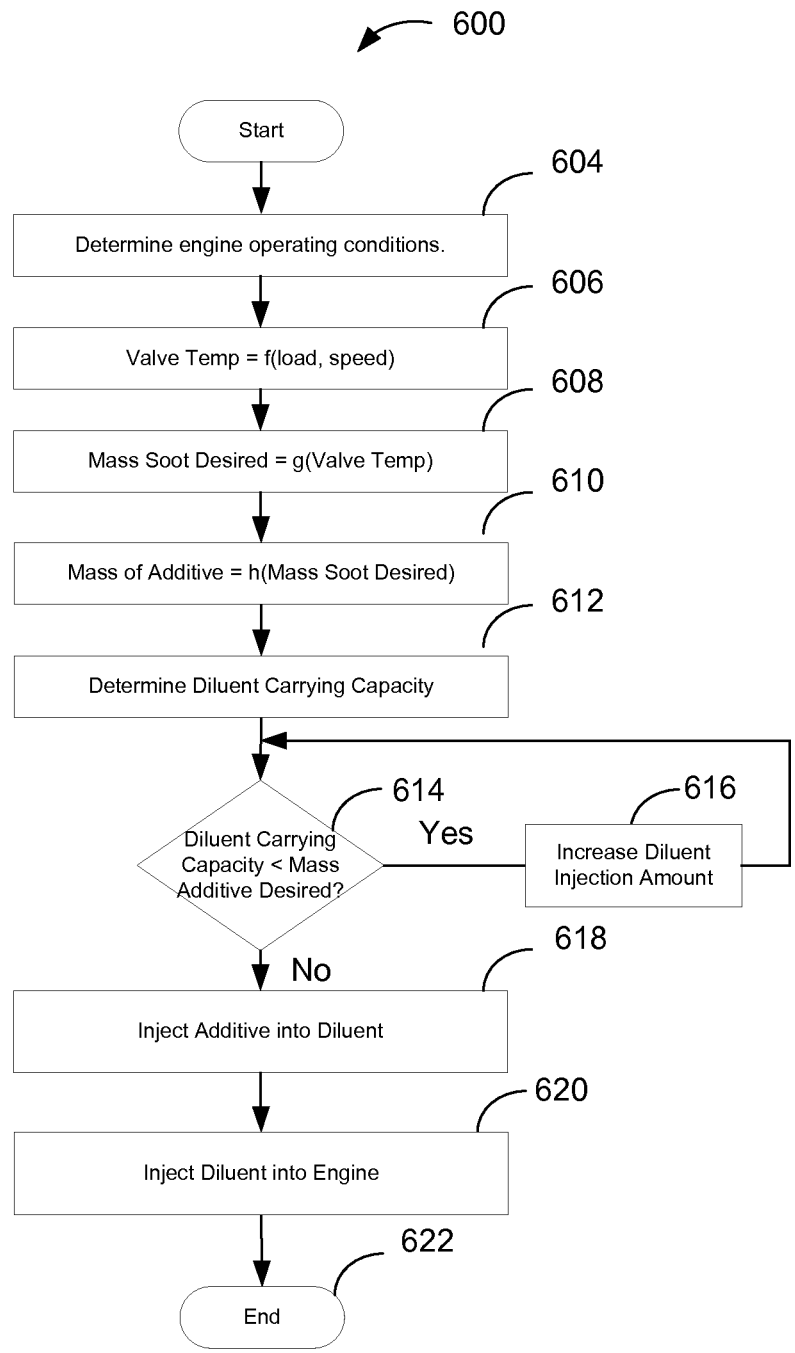

FIG. 6 shows an additional example operating method for a system that may use an additive for increased soot production. At 600 engine operating conditions may be measured, estimated or inferred, and may include various vehicle conditions, such as vehicle speed, as well as various engine operating conditions, such as engine load, speed, engine or valve temperature, exhaust temperature, boost level, MAP, MAF, torque demand, horsepower demand, AFR, etc. Operating conditions may further include a current rate of soot production and a current quantity and/or rate of diluent injection.

At 606 the temperature of an engine valve may be measured or inferred. The valve may be an intake or exhaust valve and the temperature may be determined via a sensor located on or near the valve or in another part of the engine or exhaust system. In further embodiments the temperature of a valve may be determined in a control system and may be a function of operating conditions such as engine speed or load as depicted.

A mass-of-soot desired may be determined at 608. A mass-of-soot desired may be determined in a control system and may be a function of engine or valve temperature or load as well as other operating conditions. A mass-of-soot desired may increase for heightened engine or valve temperatures, speed, or load. It may also be zero when an engine or valve temperature is below a threshold, indicating no additional soot is desired. In some embodiments, the mass-of-soot desired may refer to the mass-of-soot desired from an additive above a mass-of-soot produced by NG combustion alone. In other embodiments, a mass-of-soot desired may refer to a total mass-of-soot produced during combustion. A mass-of-soot desired may correspond to a mass-of-soot that may contribute decreased engine degradation or engine valve and valve seat wear.

At 610 a mass of additive may be determined to produce the mass-of-soot desired. This determination may be made in a control system and may be in response to several operating conditions as well as the additive's soot producing properties. For example, for a given mass-of-soot desired, a mass of additive with a higher hydrocarbon content may be lower than a mass of additive with a lower hydrocarbon content. In addition, a mass of additive may be higher or lower for a given mass-of-soot desired as a result of engine conditions, such as temperature, that may, for example, affect the completeness of combustion occurring within the engine.

In some embodiments, an additive may be injected into a diluent. The diluent may be the fuel stream, intake air, or another secondary diluent such as coolant, wiper fluid, or gasoline. Other diluents not otherwise specified may be used without departing from the scope of this disclosure. A carrying capacity for the diluent may be determined at 612. This carrying capacity may be a mass of additive that an amount of diluent is able to dissolve or transport. The carrying capacity may also be an amount of diluent or fuel able to maintain efficient combustion, engine torque, or other operating conditions. If the carrying capacity of the amount of diluent to be or currently being injected into the engine is below the mass of additive desired, the amount of diluent injected may be increased at 616. If the carrying capacity for the amount of diluent at or above the mass of additive desired at 614 the additive may be injected into the diluent at 618.

At 620 the diluent and additive solution may be injected into the engine. In some embodiments the solution may be injected into another diluent that may be injected to prevent engine knock or to lower the heat of combustion for example. Still further embodiments may inject the solution into the fuel stream, it may also be port or direct injected into the engine's cylinders.

Note that for the purposes of this disclosure a reactive additive may be understood to be an additive that reacts with a phosphate coating on a metal surface to form a lubrication layer. Non-limiting examples include stearates that may comprise an anion and stearic acid group ($C_{17}H_{35}COO^-$). The anion may be an ionizable element (EIE) such as sodium or potassium. For the purposes of this disclosure an ionizable element may be an element with a first ionization energy below 6 eV. The anion may be an element that may form a gaseous ion that may have little or no impact on an emission control catalyst.

Note that for the purposes of this disclosure, a diluent may be a liquid and may have a water or oil base. The reactive additive may be soluble within the diluent. Non-limiting examples of diluents include engine coolant, oil, wiper fluid, methanol, water, gasoline, or some combination of one or more of the above. Diluents with an oil base may be high molecular mass oils such as anthracene. Diluent may be injected into the cylinder of the engine independently of reactive additive through the reactive additive delivery system or an additional system. Delivery of diluent may be in response to knock indication or engine temperature.

Note that for the purposes of this disclosure an engine valve and/or valve seat may be a ferrous or non-ferrous metal. The valve seat may be coated in a coating that includes metallic phosphate. A metallic phosphate may be a compound containing one or more metallic ions and one or more phosphates ($PO^{-3}_4$). Non-limiting examples of a metallic ion include zinc and manganese.

Note that the example control and estimation routines included herein can be used with various system configurations. The specific routines described herein may represent one or more of any number of processing strategies such as event-driven, interrupt-driven, multi-tasking, multi-threading, and the like. As such, various actions, operations, or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, functions, or operations may be repeatedly performed depending on the particular strategy being used. Further, the described operations, functions, and/or acts may graphically represent code to be programmed into computer readable storage medium in the control system It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An engine system, comprising:
a natural gas tank coupled to an engine cylinder;
an additive delivery apparatus coupled to the engine cylinder;
an additive tank with an additive located therein coupled to the additive delivery apparatus; and
a control system with instructions to deliver an increased amount of a solution with the additive in response to a request for a desired increased soot amount.

2. The engine system of claim 1, further comprising a diluent tank coupled to the additive delivery apparatus.

3. The engine system of claim 2, wherein the diluent tank has a diluent located therein that includes gasoline, wiper fluid, engine coolant, methanol, water, oil, anthracene, or some combination thereof.

4. The engine system of claim 1, wherein the natural gas tank has natural gas located therein, the natural gas having a lower hydrocarbon content and a lower rate of soot production than the additive.

5. The engine system of claim 1, wherein the additive includes an aromatic hydrocarbon including naphthalene, benzene, or acetylene, or combinations thereof.

6. The engine system of claim 1, wherein the additive tank includes a solution including a diluent and an additive.

7. The engine system of claim 1, wherein the additive delivery apparatus includes a direct injector coupled in the engine cylinder.

8. The engine system of claim 1, further comprising a turbocharger coupled to the engine cylinder.

9. A method for operating an engine; comprising:
injecting a first quantity of gaseous fuel to the engine;
injecting an increased second quantity of solution into the engine, the solution including an additive, the increased second quantity based on an increased desired mass-of-soot to increase soot produced during combustion.

10. The method for operating the engine of claim 9, wherein the increased second quantity includes one or more of naphthalene and acetylene.

11. The method for operating the engine of claim 9, further comprising injecting the additive into a diluent forming a solution, and injecting the solution into the engine.

12. The method for operating the engine of claim 11, further comprising increasing an amount of the diluent in the solution in response to a mass of additive exceeding a carrying capacity threshold.

13. The method for operating the engine of claim 11, further comprising determining an amount of the diluent in the solution as a function of a desired AFR, engine temperature, and an indication of engine knock.

14. The method for operating the engine of claim 9, wherein injecting the increased second quantity of solution into the engine includes directly injecting the solution into one or more cylinders of the engine.

15. The method for operating the engine of claim 9, further comprising soot produced during combustion by increasing an aromatic hydrocarbon content within a cylinder of the engine.

16. A method for operating a natural gas engine, comprising:
increasing an injection of a mass of additive into the engine as a function of an increased mass-of-soot desired in response to a temperature exceeding an upper threshold; and
decreasing an injection of a mass of additive as a function of a decreased mass-of-soot desired in response to a temperature falling below a lower threshold.

17. The method of claim 16, further comprising delivering natural gas to the engine to mix and combust with the additive.

* * * * *